(12) United States Patent
Griffin

(10) Patent No.: US 11,508,043 B2
(45) Date of Patent: Nov. 22, 2022

(54) METHOD AND APPARATUS FOR ENHANCED ANTI-ALIASING FILTERING ON A GPU

(71) Applicant: Connaught Electronics Ltd, Galway (IE)

(72) Inventor: Mark Griffin, Royal Oak, MI (US)

(73) Assignee: Connaught Electronics Ltd., Galway (IE)

( * ) Notice: Subject to any disclaimer, the term of this patent is extended or adjusted under 35 U.S.C. 154(b) by 89 days.

(21) Appl. No.: 16/904,952

(22) Filed: Jun. 18, 2020

(65) Prior Publication Data

US 2021/0398256 A1    Dec. 23, 2021

(51) Int. Cl.
*G06T 5/00* (2006.01)
*G06T 5/50* (2006.01)
(Continued)

(52) U.S. Cl.
CPC .............. *G06T 5/006* (2013.01); *B60R 11/04* (2013.01); *G06T 3/4007* (2013.01); *G06T 5/50* (2013.01);
(Continued)

(58) Field of Classification Search
CPC ......... G06T 5/006; G06T 3/4007; G06T 5/50; G06T 7/74; G06T 2207/30252; G06T 5/002; G06T 5/20; B60R 11/04; G06K 9/00791; H04N 5/2351; H04N 5/247; H04N 5/23238; G06V 20/56; G06V 10/50
See application file for complete search history.

(56) References Cited

U.S. PATENT DOCUMENTS

| | | | | | |
|---|---|---|---|---|---|
| 5,684,293 | A | * | 11/1997 | Kessler | G02B 27/46 250/208.1 |
| 2002/0008697 | A1 | * | 1/2002 | Deering | G06T 5/002 345/418 |

(Continued)

FOREIGN PATENT DOCUMENTS

| | | | |
|---|---|---|---|
| CN | 109255760 A | * | 1/2019 |
| DE | 102018121280 A1 | | 3/2020 |

(Continued)

*Primary Examiner* — Ping Y Hsieh
*Assistant Examiner* — Daniella M. DiGuglielmo
(74) *Attorney, Agent, or Firm* — Osha Bergman Watanabe & Burton LLP

(57) ABSTRACT

A method for reducing abasing artefacts in an output image may include obtaining a plurality of input images captured by a plurality of cameras, each camera having a different field of view of an environment surrounding a vehicle, wherein the plurality of input images are mapped to the output image to represent the environment, from a predefined virtual point of view. The method may further include for each pixel position in the output image, obtaining a first pixel density value corresponding to a first output pixel position in the output image; and upon determining that the first pixel density value is higher than a threshold, calculating a first output brightness value corresponding to the first output pixel position based at least on a plurality of brightness values corresponding to a plurality of neighboring pixels of a corresponding position in a first input image of the plurality of input images.

20 Claims, 7 Drawing Sheets

(51) Int. Cl.
  *G06T 3/40*    (2006.01)
  *G06T 7/73*    (2017.01)
  *H04N 5/235*   (2006.01)
  *H04N 5/247*   (2006.01)
  *B60R 11/04*   (2006.01)
  *G06V 20/56*   (2022.01)

(52) U.S. Cl.
  CPC .............. *G06T 7/74* (2017.01); *G06V 20/56*
    (2022.01); *H04N 5/2351* (2013.01); *H04N*
    *5/247* (2013.01); *G06T 2207/30252* (2013.01)

(56) References Cited

U.S. PATENT DOCUMENTS

2007/0071312 A1 * 3/2007 Gardella ................ G06T 11/40
                                                        382/154
2020/0334787 A1 * 10/2020 Smirnov ............... G06T 3/4007

FOREIGN PATENT DOCUMENTS

WO    WO-2016012288 A1 *   1/2016   ............... G06T 5/10
WO    WO-2018060409 A1 *   4/2018   .......... G06T 3/4007

* cited by examiner

METHOD AND APPARATUS FOR ENHANCED ANTI-ALIASING FILTERING ON A GPU

BACKGROUND

Aspects of the present disclosure relate to a method for enhanced anti-aliasing while mapping one or more input images to an output image. In particular, the method is suited for use on a graphics processing unit.

In multi-camera automotive vision systems, two or more cameras capture different views of an environment surrounding a vehicle. These images are processed and mapped to a target viewport to generate an output image corresponding to a virtual point of view. Each of the input images go through a different transformation in the mapping process, therefore, different parts of the input images undergo different degrees of sub-sampling or up-sampling. The transformation process can introduce visual artefacts in highly detailed image content, such as small white stones.

In recent years, GPUs (Graphics Processing Units) have become the hardware of choice in video processing applications. GPUs are highly optimized for video rendering with complex geometrical transformations. However, simple filtering operations that were relatively easy to implement on digital signal processing (DSP) architectures in real-time, are more difficult to implement on GPU architectures. Consequently, image processing operations need to be redesigned on GPU devices for real-time performance. There is a need in the art for methods of transforming one or more input images using a GPU to generate an output image with minimal aliasing effects.

BRIEF SUMMARY

Methods, apparatuses, and computer-readable media are disclosed for reducing aliasing artefacts in an output image. In one embodiment, the method includes obtaining a plurality of input images captured by a plurality of cameras, each camera having a different field of view of an environment surrounding a vehicle. The plurality of input images are being mapped to the output image such that the output image represents the environment from a predefined virtual point of view. The method further includes for each pixel position in the output image, obtaining a first pixel density value corresponding to a first output pixel position in the output image, and upon determining that the first pixel density value is higher than a threshold, calculating a first output brightness value corresponding to the first output pixel position based at least on a plurality of brightness values corresponding to a plurality of neighboring pixels of a corresponding position in a first input image of the plurality of input images.

In one embodiment, the method further includes upon determining that the first pixel density value is equal to or lower than a threshold, calculating the first output brightness value corresponding to the output pixel position based on a brightness value of a pixel in the input image corresponding to the first pixel position in the output image.

In one embodiment, the method further includes obtaining the first pixel density value corresponding to the first pixel position of the output image comprises selecting a second pixel directly to the left of the first pixel position, and selecting a third pixel directly to the right of the first pixel position in the output image, determining a second input pixel position and a third input pixel position in the first input image, corresponding to the second and third pixel positions in the output image, respectively. And, calculating a first distance value between the second input pixel position and the third input pixel position. The method further includes selecting a fourth pixel directly above the first pixel, selecting a fifth pixel directly to the bottom of the first pixel, determining a fourth input pixel position and a fifth input pixel position in the first input image, corresponding to the fourth and fifth pixel positions in the output image, respectively, calculating a second distance value between the fourth input pixel position and the fifth input pixel position, and calculating the pixel density corresponding to the first pixel as a function of a maximum of the first distance value and the second distance value.

In one embodiment, obtaining the pixel density includes receiving a predetermined pixel density value corresponding to the first pixel location in the output image.

In one embodiment, the first pixel density value represents a measure of the number of pixels in an input image that is mapped between a first pixel in the output image and a second pixel directly adjacent to the first pixel.

In one embodiment, determining the first output pixel brightness value comprises calculating the first output brightness value as a weighted average of a plurality of brightness values corresponding to a plurality of neighboring pixel values in the first input image.

In one embodiment, a weight corresponding to each brightness value is calculated based on a distance between a position in the first input image corresponding to the first output pixel and each of four pixels directly adjacent to the position in the first input image.

In one embodiment, the plurality of brightness values include prefiltered brightness values corresponding to each of the plurality of the neighboring pixel values in the first input image. The prefiltered brightness values are calculated by a graphics processing unit (GPU) by means of bilinear interpolation.

DETAILED DESCRIPTION

Figure 1:
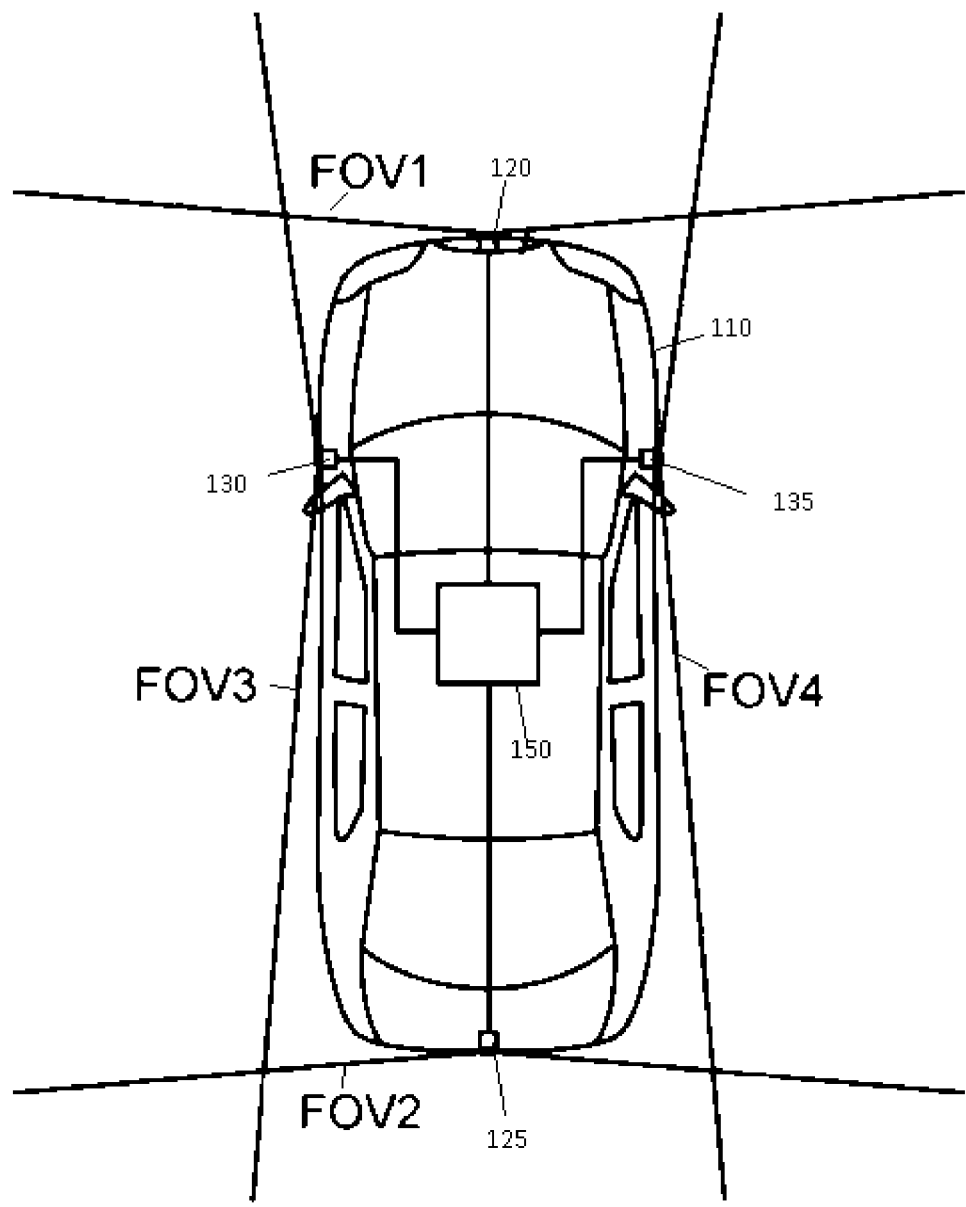
FIG. 1 illustrates an example vehicle comprising a camera system and a graphics processing unit, in accordance with certain embodiments of the present disclosure.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

It will be apparent to those skilled in the art that substantial variations may be made in accordance with specific requirements. For example, customized hardware might also be used, and/or particular elements might be implemented in hardware, software (including portable software), or both. Further, connection to other computing devices such as network input/output devices may be employed.

In multi-camera automotive surround view vision systems, two or more cameras capture different views of an environment surrounding a vehicle. The captured images are transformed and mapped to a target viewport to generate an output image corresponding to a virtual point of view. The output image is usually a mosaic image that represents a point of view from the predefined three-dimensional (3D) point on or around the vehicle (e.g., virtual point of view). Geometrical transformations for each portion of the captured input images are determined based on position of the corresponding camera (as well as its internal parameters) relative to the target plane and position of the virtual render camera. In one example, for generating a top-view output image, a virtual camera is assumed to be above the vehicle looking from the top central position.

Each of the input images may go through a different transformation in the mapping process. In addition, different parts of the input images may undergo different degrees of sub-sampling or up-sampling. The transformations can introduce visual artefacts in highly detailed image content, such as small white stones. The visual artefacts may be due to "Squeezing," which may cause aliasing effects, and "Zooming," which may cause blurring effects. Parts of the images that undergo significant sub-sampling in the mapping process are of special interest in this disclosure, since they may have the highest level of aliasing issues. Generally, areas in the image that are close to the cameras undergo the highest degrees of size reduction. Aliasing is introduced when the corresponding region of interest of the image contains highly detailed image structures and undergoes size reduction.

The term "pixel density" is used herein to show a measure of the squeezing or compression of image content when mapping an input image to an output image through a target viewport. In particular, the pixel density represents an amount of sub-sampling or up-sampling that the input image undergoes while being projected to the target viewport from the perspective of the virtual point of view. For example, when a large area of the input image is mapped to a very small area of the output image, the mapped image content is subject to very strong compression. Therefore, the pixel density value associated with the corresponding pixels in the output image is large. On the other hand, if a small area of the input image is mapped to an equally sized area of the output image, the image content that is mapped to the output image is not compressed. Therefore, the pixel density value associated with the corresponding pixels in the output image is considered to be very small.

The anti-aliasing filtering as described herein can be applied to all the pixels of the output image or a certain group of pixels within a predefined region. The anti-aliasing filter may be adapted based on the parameters of the input image and/or pixel density corresponding to each output pixel or a group of pixels within a predefined region of the output image (e.g., regions that have undergone resizing during the mapping process). Furthermore, the method described herein can be used to transform images from a single camera or multiple cameras, without departing from the teaching of the present disclosure.

In one embodiment, two or more images that are simultaneously captured by different cameras of the vehicle can be mapped to corresponding regions of the viewport image and are merged together. The filtering can be performed for each region of interest of the output images and/or for each camera separately. Portions of the output images can be rendered and merged together to provide a single output image, such as a top view image or a bowl-view image. This final output image can then be displayed on a display device of the vehicle.

For generating a top-view image, the target viewport can be defined as a flat 2D plane, perpendicular to the vehicle's vertical axis. The virtual point of view can be chosen to be above the vehicle viewing downward toward the ground. In another example, the output image can also be provided as a bowl view image, in which the target viewport constitutes part of a bowl or sphere. The virtual point of view can be in any arbitrary 3D position above or around the vehicle looking at the inner part of the bowl.

Graphics Processing Units (GPUs) are highly optimized processors for video rendering applications with complex geometrical transformations. However, simple filtering operations that were relatively simple to implement on digital signal processor (DSP) architectures in real-time are more difficult to implement on GPU architectures, even with commonly supported drivers and available optimized functions. Consequently, the DSP-friendly operations for multi-camera video processing need to be redesigned for real-time performance on GPUs. In multi-camera automotive vision systems, final visual quality of the output image depends heavily on supported video enhancement functionalities of the GPU and other filtering procedures (e.g., anti-aliasing).

FIG. 1 illustrates an example vehicle 110 including a camera system and a graphics processing unit in accordance with certain embodiments of the present disclosure. The camera system is configured as a surround view camera system and includes a front camera 120, a right mirror camera 135, a rear camera 125, and a left mirror camera 130 and a GPU 150. Each of these cameras can be configured as a wide angle camera and may include a fisheye lens or similar optics. Therefore, a large field of view can be captured by each of the cameras. In this example, the front camera 120 has field of view FOV1, which is illustrated by corresponding borderlines. Similarly, the rear camera 125, left mirror camera 130 and right mirror camera 135 have corresponding field of views FOV2, FOV3, and FOV4, respectively. Each of the cameras is configured to capture a portion of the surrounding environment of the vehicle 110. Moreover, the respective fields of views FOV1, FOV2. FOV3, and FOV4 overlap with each other. The camera system also comprises an image processing module to process the captured images. In one example, the image processing module may be a GPU 150 that maps the captured images to a target viewport, such as a 3D bowl or a flat 2D plane. The GPU may merge the images and render them on the target viewport, from a predefined virtual camera point of view, Example images captured by the cameras around the vehicle are illustrated in FIGS. 2A, 2B, 2C and 2D. Each of these images may be mapped to a specific portion of the target viewport.

Figure 2A:
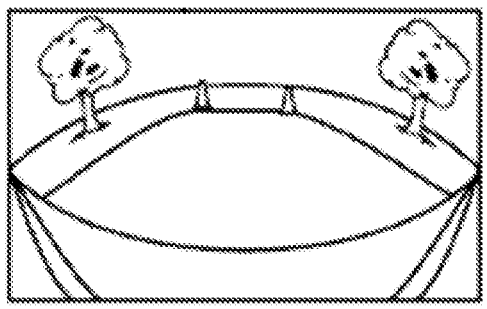
FIGS. 2A, 2B, 2C and 2D illustrate example images captured by different cameras of the vehicle that can be used as inputs to the enhanced anti-aliasing filter, in accordance with certain embodiments of the present disclosure.
Figure 2B:
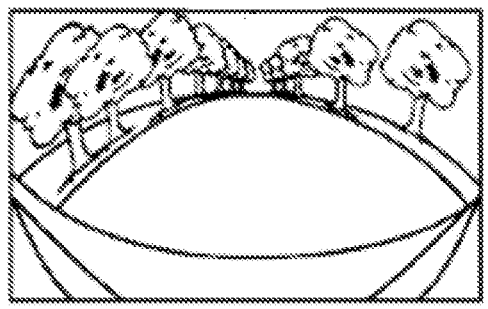
Figure 2C:
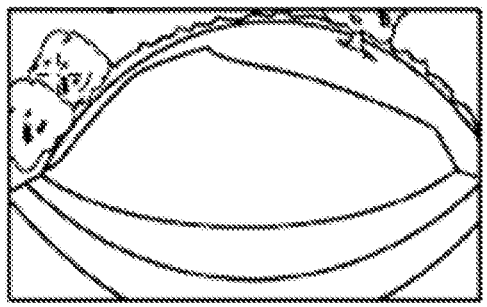
Figure 2D:
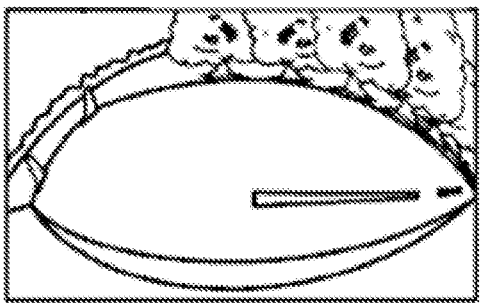

FIGS. 2A, 2B, 2C and 2D illustrate example images captured by different cameras of the camera system, in accordance with certain embodiments of the present disclosure. FIG. 2A illustrates the image captured by the front camera. Similarly, FIGS. 2B, 2C and 2D illustrate, images captured by the rear camera, left mirror camera and right mirror camera, respectively. Each of these images is mapped to a specific portion of the output viewport, as shown in FIG. 3.

Figure 3:
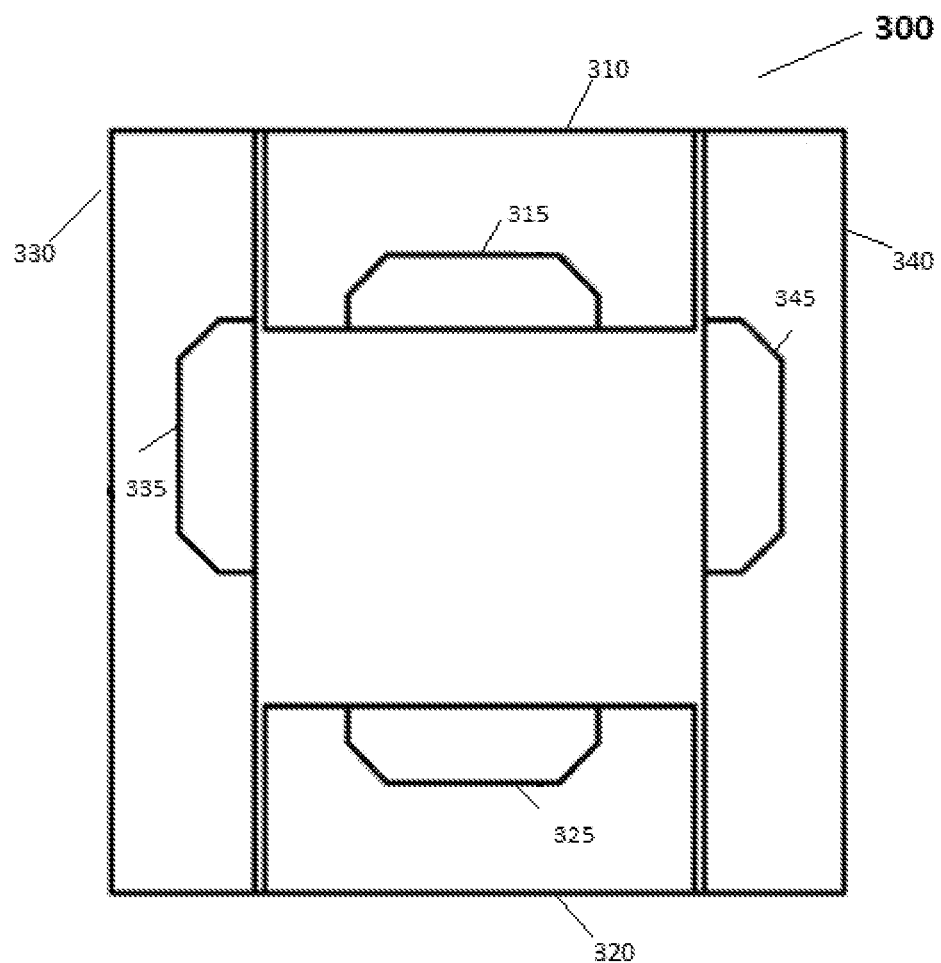
FIG. 3 illustrates a target viewport used for generating an example output image by mapping multiple input images, in accordance with certain embodiments of the present disclosure.

FIG. 3 illustrates a target viewport 300 for generating an example output image by mapping multiple input images, in accordance with certain embodiments of the present disclosure. As illustrated, the target viewport 300 is divided into several sections. Each section corresponds to the images captured by one of the cameras around the vehicle. For example, section 310 corresponds to the front camera 120, section 320 corresponds to the rear camera 125, section 330 corresponds to left mirror camera 130 and section 340 corresponds to the right mirror camera 135. In one example, the input image captured by the front camera, is mapped to section 310 of the target viewport using a predefined geometrical transformation. Similarly, images captured by rear camera, left mirror camera and right mirror cameras are mapped to sections 320, 330 and 340, respectively. The geometrical transformation that is applied to each input image corresponding to each section depends on the location of the virtual camera (e.g., virtual point of view) in relation to the position of the real camera that has captured the input image. The geometrical transformation may also depend on internal parameters of the capturing cameras. The mapped images may be merged together to generate an output image corresponding to a top view image. Thus, different parts of the input images undergo different degrees of sub-sampling or up-sampling, which can introduce visual artefacts in cases of highly detailed image content. The visual artefacts may be caused by squeezing and/or zooming. In one embodiment, visual artefacts caused by squeezing could be much more visible. The areas 315, 325, 335 and 345 in these output images represent areas in the images that undergo significant sub-sampling during the mapping process. These areas 315, 325, 335 and 345 that are very close to the respective cameras 120, 125, 130 and 135, undergo the highest degrees of resizing (e.g., size reduction). Size reduction causes aliasing in the images, especially when the corresponding images contain highly detailed structures, for example small white stones.

To reduce or compensate such aliasing effects, the GPU 150 may perform anti-aliasing filtering to generate each of the respective output images. Using a GPU device has a variety of advantages for multi-camera system. A GPU facilitates real-time design of multi-camera vision systems using multiple views with easily varied surface shapes and render camera characteristics. This is because GPU devices are particularly friendly towards rendering operations and geometric transformations that most often in a digital signal processor (DSP) are difficult to design and implement in real-time. As a result, free-view multi-camera visualization in 3D has become feasible and available in current automotive embedded systems. However, on the other hand, simple filtering operations that were relatively simple to implement an DSP in real-time, are more difficult in a GPU even with commonly supported drivers and available optimized functions. Consequently, the DSP friendly operations should be more carefully designed on GPU devices for real-time performance. This is considered as highly important because the final visual quality of the multi-camera views depend heavily on supported video enhancement for the input camera images and necessary geometrical transformations for the multi-camera views. Advantageously, the invention and its embodiments allow for a real-time anti-aliasing scheme for multi-camera automotive systems based on GPU architectures, which is explained in more detail later. It should be noted that although the invention is described with example automotive multi-camera systems, the teachings herein could be applied to any type of camera system without departing from the teachings of the present disclosure.

Figure 4:
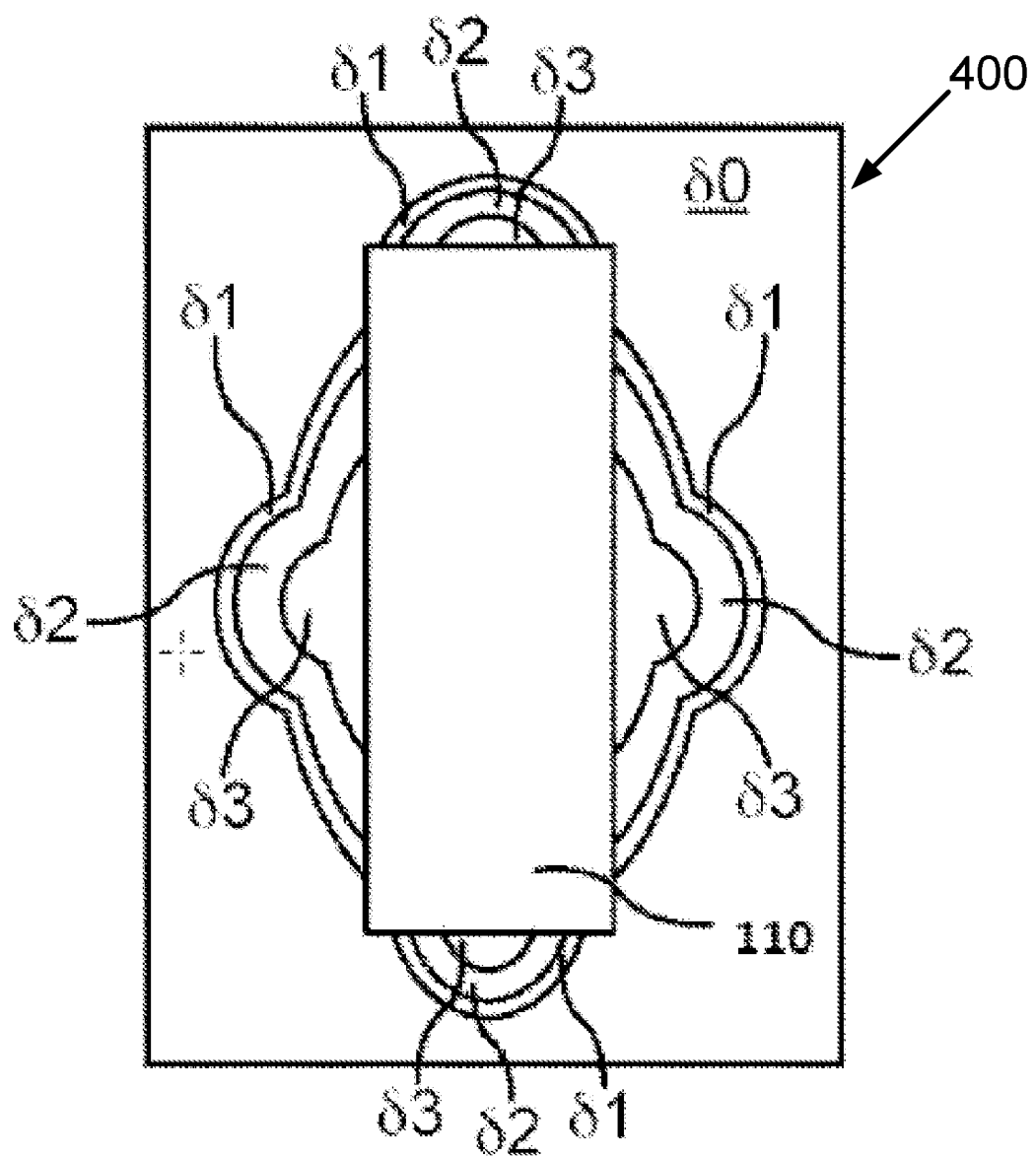
FIG. 4 illustrates an example density map representing pixel density values of different pixels of an output image relative to the vehicle, in accordance with certain embodiments of the present disclosure.

FIG. 4 illustrates an example density map representing pixel density values for different pixels of an output image, in accordance with certain embodiments of the present disclosure. As illustrated, the density map 400 shows the pixel densities $\delta 0$, $\delta 1$, $\delta 2$ and $\delta 3$, for each pixel region in the output images 310, 320, 330 and 340 relative to the vehicle 110. For the purpose of illustration and for simplification only few regions with different pixel densities $\delta 0$, $\delta 1$, $\delta 2$, and $\delta 3$ are shown in FIG. 4. Generally, the pixel density may also vary from pixel to pixel very strongly and the pixel density can have far more than four different values. In one embodiment, each of the pixel densities $\delta 0$, $\delta 1$, $\delta 2$ and $\delta 3$ can range from zero to one, in which zero represents the lowest pixel density and one represents the highest pixel density. In FIG. 4, the pixel density $\delta 3$ in the region closest to the cameras is the highest, (e.g., pixel density equal to one). Similarly, regions further away from the cameras and the vehicle correspond to the pixel density $\delta 0$, e.g., equal to zero. These pixel density values are utilized to enhance the anti-aliasing filtering procedure on a GPU as explained in more detail later.

Certain embodiments disclose an enhanced anti-aliasing filtering method that selectively applies filtering to remove aliasing artefacts in the image only when certain conditions are met. By applying the anti-aliasing filter in geometrical areas of the output viewport where aliasing is suspected, the processing load and processing time are reduced without any noticeable change in quality of the output image. In one example, the aliasing artefacts that need to be removed usually occur in a top view image in areas where pixel density is high, and significant sub-sampling occurs. Aliasing artefacts are expected when input images are mapped to the top view output image corresponding to high pixel density areas. Therefore, certain embodiments perform the four-pixel GPU anti-aliasing filtering process when the pixel density is high and utilize a much simpler transformation when aliasing effect is not expected. As a result, rendering time and operation cost of applying the abasing filter is greatly reduced.

An anti-aliasing filter as described in DE102018121280 with common inventors performs four pixel read operations of the input image to generate each output pixel of the top view image. Strength of this filter is dependent on pixel density for the corresponding pixel position. In this scheme, GPU optimized rendering features are used and four pixel read operations are performed. The output pixel value in this scheme has contribution from sixteen pixels rather than four pixels. An output value with contribution from sixteen pixel values corresponds to stronger filtering in comparison to an output value that has contribution from four pixels. Output value for the pixel of interest is determined by using GPU automatic bilinear interpolation, in addition to four pixel read operations. The above anti-aliasing filtering method utilizes optimized features of the GPU to reduce processing time and provide an adequate reduction in aliasing. This method utilizes pixel density value, spatially local statistics and brightness values from four pixel samples (with automatically computed bilinear interpolation based on adjustable coordinates) to obtain over-sampled 4×4 anti-aliasing interpolation through adaptive weighted averaging of four pixels. In one example, the weights are determined by a local content adaptive manner and coordinate distances. Such a scheme is suited for real-time multi-camera view rendering applications in automotive systems based on GPU devices with standardized supported drivers (which include a set of optimized functions). In this scheme, the higher the pixel density, the stronger the applied filtering.

Although the above method of filtering on GPU architectures provides an acceptable visual performance of removing the aliasing artefacts, it still does not perform optimally in terms of the time spent on the filtering operation. In this method, the GPU performs four pixel read operations of the input image, for each output pixel of the top view image that will be sent to the output screen. It should be noted that since pixel read operations are expensive on GPU architectures, it is desirable to reduce the number of pixel read operations as much as possible.

Certain embodiments disclose an enhanced anti-aliasing filtering procedure by minimizing the number of pixel read operations even further. For example, by comparing the value of the pixel density for each pixel location in the output image to a threshold, the filtering operation may be performed when the pixel density is higher than the threshold. If the pixel density is lower than the threshold, the filtering procedure may only read one brightness value (instead of four brightness values), and output it as the brightness value of the output pixel. This scheme can save a significant amount of processing time. Therefore will reduce the time cost of applying the anti-aliasing filter.

As an example, the following pseudocode may be used for the enhanced anti-aliasing procedure:

```
if (pixelDensity > Threshold)
    {Do Filtering:
        Perform four pixel reads and determine final output value}
else
        {Perform one pixel read, this is the output value}
```

The enhanced anti-aliasing filter method presented herein results in significant savings in terms of read operations in the GPU. As an example, for the image shown in FIG. 4 with top-view output image with a total of 236,430 pixels, four pixel read operations may be performed for pixel density values δ1, δ2, and δ3, which may result in 80,100 pixels. As a result, for (80,100/236,430)~33% of the pixels of the top-view image, four pixel read operation needs to be performed in the anti-aliasing filter and for the rest of the pixels corresponding to pixel densities smaller than a threshold (e.g., pixel density=δ0), only one pixel read operation is performed. As a result, a reduction of 66% of processing load can be achieved compared to other implementations of anti-aliasing filtering that perform at least four pixel read operations for all of the output pixels in the output viewport.

Figure 5:
FIG. 5 illustrates example operations that may be performed for enhanced anti-aliasing filtering of an image, in accordance with certain embodiments of the present disclosure.

FIG. 5 illustrates example operations that may be performed for enhanced anti-aliasing filtering for an output image, in accordance with certain embodiments of the present disclosure. At 510, a plurality of input images are obtained. In one example, the plurality of input images are captured by a plurality of cameras, each camera having a different field of view of an environment surrounding a vehicle. The plurality of input images are being mapped to an output image such that the output image represents the environment from a predefined virtual point of view.

At 520, for each pixel position in the output image, a first pixel density value corresponding to a first output pixel position in the output image is obtained. The first pixel density is compared with a threshold value. At 530, upon determining that the first pixel density value is higher than the threshold, a first output pixel brightness value corresponding to the first output pixel position is calculated based at least on a plurality of brightness values corresponding to a plurality of neighboring pixels of a corresponding position in a first input image of the plurality of input images.

Furthermore, at 540, upon determining that the first pixel density value is equal to or lower than a threshold, the first output brightness value corresponding to the output pixel position is calculated based on a brightness value of a pixel in the input image corresponding to the first pixel position in the output image.

In one embodiment, obtaining the first pixel density value corresponding to the first pixel position of the output image includes calculating the pixel density value by selecting a second pixel directly to the left of the first pixel position, and selecting a third pixel directly to the right of the first pixel position in the output image. In addition, the method includes determining a second input pixel position and a third input pixel position in the first input image corresponding to the second and third pixel positions in the output image, respectively. Next, a first distance value may be calculated between the second input pixel position and the third input pixel position. A fourth pixel may also be selected directly above the first pixel, and a fifth pixel may be selected directly below the first pixel. Similarly, a fourth input pixel position and a fifth input pixel position in the first input image may be determined, each of which corresponds to the fourth and fifth pixel positions in the output image. Next, a second distance value is calculated between the fourth input pixel position and the fifth input pixel position. Furthermore, the pixel density corresponding to the first pixel is calculated as a function of a maximum of the first distance value and the second distance value.

In one embodiment, a predetermined pixel density value corresponding to the first pixel location in the output image may be received. As an example, the pixel density values corresponding to each of the output pixels in an output viewport can be determined in advance and saved in a memory. These values may then be read from the memory and used to determine whether a strong filtering should be used on each specific output pixel. In general, the first pixel density value represents a measure of the number of pixels in an input image that are mapped between a first pixel in the output image and a second pixel directly adjacent to the first pixel. The higher the pixel density, the stronger anti-aliasing mechanism is needed.

In one embodiment, the first output pixel brightness value is determined by calculating the first output brightness value as a weighted average of a plurality of brightness values corresponding to a plurality of neighboring pixel values in the first input image. As an example, a weight corresponding to each brightness value is calculated based on a distance between a position in the first input image corresponding to the first output pixel and each of four pixels directly adjacent to the position in the first input image.

In one embodiment, the plurality of brightness values include prefiltered brightness values corresponding to each of the plurality of the neighboring pixel values in the first input image. The prefiltered brightness values can be calculated by GPU using bilinear interpolation functions.

As explained above, because a strong resizing caused by significant sub-sampling intensifies the aliasing effect, it is advantageous to adapt the filtering to the degree of resizing. For this purpose, a density map can be created, which indicates for each pixel in the output image the corresponding local pixel density of the input image.

Figure 6:
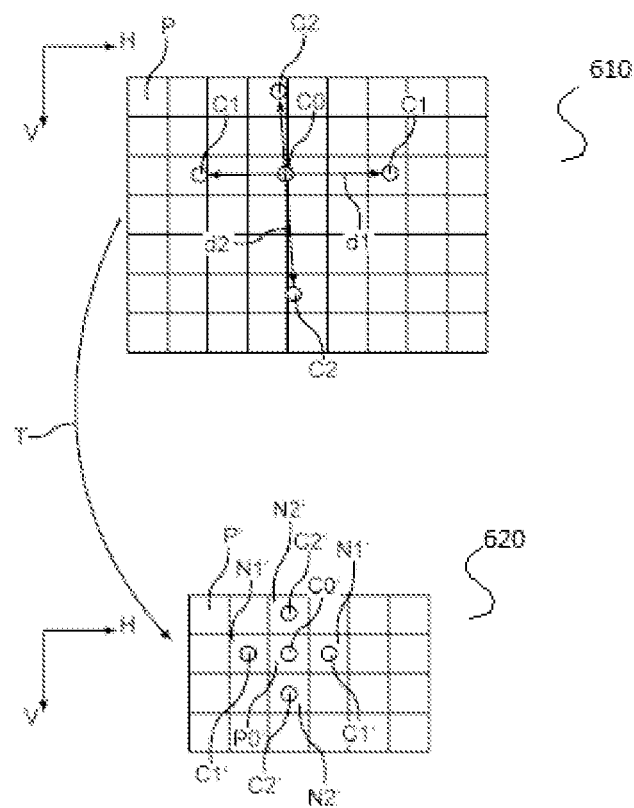
FIG. 6 illustrates an example output image generated by geometrical transformation of an input image, in accordance with certain embodiments of the present disclosure.

Pixel Density Calculation:

In one embodiment, pixel density corresponding to each pixel in the output image is calculated as a maximum distance in the input image between positions associated with neighbors of a pixel in the output image in vertical and horizontal directions. FIG. 6 illustrates the process of calculating pixel density in more detail.

FIG. 6 shows a schematic illustration of an input image 610, which is mapped by geometrical transformation T to a corresponding output image in a two-dimensional space (e.g., a horizontal axis (H) and a vertical axis (V)). In this example, size of the input image 610 is reduced in the transformation process (e.g., the output image has reduced number of pixels). As an example, if the input image has P pixels, and the output image has P' pixels, P'<P. The local pixel density for a pixel P0' in the output image 620 can be determined with the following process. First, two neighboring pixels N1' of the pixel of interest P0' in horizontal direction are identified in the output image 620. For each of the neighboring pixels N1', a corresponding position C1 in the input image 610 can be determined. In FIG. 6, the position of each pixel is shown by a dot in the center of the pixel. For example, the position of the pixel P0' is marked by C0', and the positions of the two neighboring pixels N1' are marked by C1'.

The positions C1 in the input image 610 corresponding to the two identified neighboring pixels N1' in the output image 620 can be calculated by applying a suitable transformation function. As an example, an inverse of the geometrical transformation T can be used on the positions C1' of the neighboring pixels N1' in the output image 620 to find the corresponding locations in the input image 610. These remapped pixel positions C1 in the input image 610 may not coincide with any integer pixel position but can be located anywhere in the input image 610. In one example, the positions C1 can be represented by floating point coordinates with one decimal place. After finding the positions C1, a distance d1 between the positions C1 in the input image 610 is determined.

Next, a similar procedure is performed to identify two neighboring pixels N2' of the pixel P0' in vertical direction in the output image 620 and calculate a distance d2 between corresponding positions in the input image. The neighboring pixels N2' are in positions C2' in the output image, with corresponding positions C2 in the input image 610. In this procedure, the first distance d1 is a measure for horizontal pixel density, and the second distance d2 is a measure for the vertical pixel density at position C0' in the output image 620. The larger these distances d1 and d2, the larger the corresponding pixel densities in the output image. Next, a final density value for the pixel of interest P0' is calculated based on a maximum of distances d1 and d2. The above procedure can be performed for each pixel P' of the output image 620 to calculate their corresponding pixel density.

The first and second distances d1 and d2 are measures of the pixel density at the position of the pixel of interest in the output image in the horizontal and vertical directions. By using a maximum of these two distances, the worst-case scenario with regard to aliasing can be taken into account while simplifying calculations. The pixel density value can be calculated as a function of the maximum of the first and second distances. In one example, the maximum of the first and second distance can be subject to a further transformation, which maps the maximum distance value to a corresponding density value (e.g., within a predefined range, e.g., from zero to one).

In one embodiment, a density value of zero may correspond to cases where distances between the neighboring pixels in horizontal and vertical directions in the output image are equal to (or even larger than) the distances between the corresponding positions in the input image. On the other hand, if the maximum of the first and second distance is greater than the distance between the horizontal and vertical neighboring pixels in the output image, the corresponding density value may be considered to be between zero and one.

GPU devices are supported by standard drivers and operating systems. As an example, currently available optimized functions also include 2×2 bilinear interpolation, in which the GPU efficiently accesses four neighboring pixels and performs the interpolation. The bilinear interpolation function uses the same number of processing cycles as a single pixel read operation. The bilinear interpolation function may be used to extract information from four pixels without a need to perform costly read out operations on the GPU. Therefore, the brightness values that are used to calculate a brightness value for a pixel of interest in the output image can be provided by performing bilinear interpolation on a corresponding position in the input image and its neighboring pixels. By suitably choosing these positions, strength of the anti-aliasing filtering can be adapted. Therefore, it is possible to utilize information from a larger neighborhood surrounding a point of interest in the input image, and at the same time use a small number of read out operations.

In addition, by performing filter operations for the pixel positions that are highly probable in terms of aliasing artefacts, the processing time can be reduced even further. These enhancements to the surround view automotive vision systems results in significant reduction in processing time of the enhanced anti-aliasing filter.

Figure 7:
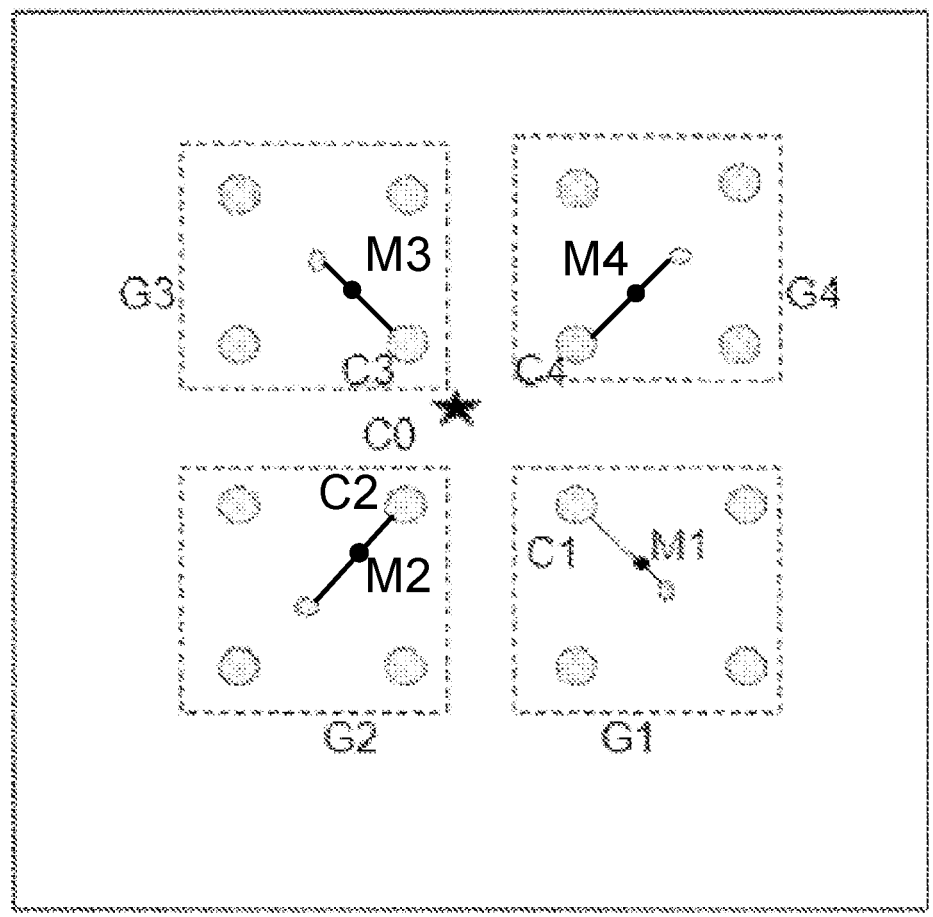
FIG. 7 illustrates an example input image in pixel-level detail that can be used as an input to the enhanced anti-aliasing system, in accordance with certain embodiments of the present disclosure.

FIG. 7 illustrates an example input image in pixel-level detail that can be used as an input to the enhanced anti-aliasing system, in accordance with certain embodiments of the present disclosure. In this figure, each pixel position of the input image is represented by a corresponding dot at the center of the pixel. In one embodiment, the output image may be filtered as described below with respect to pixel of interest P0'. First, a position C0 in the input image corresponding to the pixel P0' of the output image is identified, which is illustrated by a star in FIG. 7. Next, four immediate neighboring pixels to the position C0 are identified in both horizontal and vertical directions. The neighbor pixel at position C1 is considered to be part of a pixel group G1, which includes three other neighbors of C1 that do not have any overlap with any of the pixels at positions C2, C3 or C4.

Next, position of point M1 is determined as a function of pixel density associated with position C0'. The point M1 is assumed to be located on a line segment bounded by the position C1 and center of the group G1. Distance of point M1 from point C1 is determined as a function of pixel density value at position C0'. In one embodiment, distance of point M1 may be a linear function of the pixel density value at position C0'. If pixel density value is equal to zero, M1 may overlap on C1 and if pixel density is equal to one, M1 may reside on the center point of group G1. By adjusting distance of point M1 from C1, strength of the anti-aliasing filtering can be adjusted.

In addition, prefiltered brightness value of point M1 is calculated by bilinear interpolation of four brightness values of the pixels in Group G1 The bilinear interpolation can be performed very efficiently using the Open Graphics Library (OpenGL) bilinear interpolation function available for GPUs. It should be noted that by using the optimized bilinear interpolation function of the GPU, although four brightness values are used to calculate the brightness value of point M1 reading these brightness values do not use the expensive read-out operation of the GPU (since these brightness values do not need to be available for future operations). In one embodiment, if the pixel density value is equal to zero, point M1 may overlap with C1. In this case, the bilinear interpolation may be skipped and the prefiltered brightness value of M1 may, be considered equal to the brightness value of point C1. If the pixel density is smaller than a predetermined threshold, the brightness value of point C1 may, be output as the brightness value corresponding to pixel of interest P0'. If pixel density value is equal to or larger than the threshold, similar procedure may be used to determine prefiltered brightness values at three other points M2, M3 and M4 corresponding to pixel positions C2, C3 and C4 in Groups G2, G3, and G4, respectively.

A weighted average of the prefiltered brightness values at points M1, M2, M3 and M4 may be calculated to generate the filtered brightness value corresponding to pixel of interest P0'. Therefore, the extended 4×4 pixel neighborhoods are covered for tutoring by using only four expensive read out operations in case the pixel density is higher than a threshold (anti-aliasing filtering is needed). This procedure significantly reduces the processing time for rendering while providing advanced visual quality in terms of aliasing artefacts. Thereby, the pixel access and bilinear interpolation functions can be used from the existing and supported GPU OpenGL, SGX drivers. The weights can be computed based on distance between the neighbor pixel positions C1, C2, C3 C4, and the position C0 in the input image. In one embodiment, the weights may be computed using Euclidean distance. It should be noted that the weights can be calculated using any other method without departing from the teachings of the present disclosure.

If the brightness values at the points M1, M2, M3 and M4 differ from each other considerably, this indicates that the input image contains highly detailed image structures, which may intensify the aliasing effect. In one embodiment, in such a case a stronger filtering can be performed, for example, by shifting the positions of the points M1, M2, M3 and M4 outwards, namely towards the respective group centers and/or by adapting the weights correspondingly.

The techniques disclosed herein allow for efficient anti-aliasing filtering on GPU in real-time for multi-camera systems. Number of costly pixel readout operations are reduced by using pixel density information corresponding to an output position in the output viewport. The proposed method reduces the time required to perform anti-aliasing filtering considerably without reducing quality of the output image.

With reference to the appended FIGS., components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processing units and/or other device(s) for execution, Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A method for reducing aliasing artefacts in an output image, comprising:
    obtaining a plurality of input images captured by a plurality of cameras, each camera having a different field of view of an environment surrounding a vehicle, wherein the plurality of input images are mapped to the output image such that the output image represents the environment from a predefined virtual point of view; and
    for each output pixel position in the output image: obtaining a first pixel density value corresponding to a first output pixel position in the output image; and
    upon determining that the first pixel density value is higher than a threshold, calculating a first output brightness value corresponding to the first output pixel position in the output image based at least on a plurality of brightness values corresponding to a plurality of neighboring pixels of a corresponding position in a first input image of the plurality of input images,
    wherein the first pixel density value determines an amount of sub-sampling or up-sampling of image content when mapping the plurality of input images to the first output pixel position in the output image through a target viewport, and
    determining that a strong anti aliasing mechanism is needed when the first pixel density value is greater than a predetermined pixel density value, wherein the strong anti-aliasing mechanism is performed by shifting positions of the plurality of neighboring pixels of the corresponding position in the first input image of the plurality of input images toward respective group centers and by adapting weights for the plurality of neighboring pixels correspondingly.

2. The method of claim 1, further comprising:
    upon determining that the first pixel density value is equal to or lower than a threshold, calculating the first output brightness value corresponding to the first output pixel position in the output image based on a brightness value of a pixel in the first input image of the plurality of input images corresponding to the first output pixel position in the output image.

3. The method of claim 1, wherein obtaining the first pixel density value corresponding to the first output pixel position in the output image comprises:
selecting a second output pixel directly to the left of the first output pixel position in the output image, and selecting a third output pixel directly to the right of the first output pixel position in the output image;
determining a second input pixel position and a third input pixel position in the first input image, corresponding to the second and third output pixel positions in the output image, respectively;
calculating a first distance value between the second input pixel position and the third input pixel position;
selecting a fourth output pixel directly above the first output pixel position in the output image, and selecting a fifth output pixel directly to the bottom of the first output pixel position in the output image;
determining a fourth input pixel position and a fifth input pixel position in the first input image, corresponding to the fourth and fifth output pixel positions in the output image, respectively;
calculating a second distance value between the fourth input pixel position and the fifth input pixel position; and
calculating the first pixel density value corresponding to the first output pixel position in the output image as a function of a maximum of the first distance value and the second distance value.

4. The method of claim 1, wherein obtaining the first pixel density value comprises:
receiving the predetermined pixel density value corresponding to the first output pixel position in the output image.

5. The method of claim 1, wherein the first pixel density value represents a measure of number of pixels in an input image that are mapped between the first output pixel in the output image in the output image and a second pixel directly adjacent to the first output pixel in the output image.

6. The method of claim 1, wherein determining the first output pixel brightness value corresponding to the first output pixel position in the output image comprises:
calculating the first output brightness value corresponding to the first output pixel position in the output image as a weighted average of the plurality of brightness values corresponding to the plurality of neighboring pixel values in the first input image.

7. The method of claim 6, wherein a weight corresponding to each brightness value is calculated based on a distance between a position in the first input image corresponding to the first output pixel position in the output image and each of four pixels directly adjacent to the position in the first input image.

8. The method of claim 6, wherein the plurality of brightness values comprise prefiltered brightness values corresponding to each of the plurality of the neighboring pixel values in the first input image, wherein the prefiltered brightness values are calculated by a graphics processing unit (GPU) by means of bilinear interpolation.

9. An apparatus for reducing aliasing artefacts in an output image, comprising at least one processor coupled to a memory, the at least one processor is configured to:
obtain a plurality of input images captured by a plurality of cameras, each camera having a different field of view of an environment surrounding a vehicle, wherein the plurality of input images are mapped to the output image such that the output image represents the environment from a predefined virtual point of view; and
for each output pixel position in the output image: obtain a first pixel density value corresponding to a first output pixel position in the output image;
and upon determining that the first pixel density value is higher than a threshold, calculate a first output brightness value corresponding to the first output pixel position in the output image based at least on a plurality of brightness values corresponding to a plurality of neighboring pixels of a corresponding position in a first input image of the plurality of input images,
wherein the first pixel density value determines an amount of sub-sampling or up-sampling of image content when mapping the plurality of input images to the first output pixel position in the output image through a target viewport, and
determining that a strong anti-aliasing mechanism is needed when the first pixel density value is greater than a predetermined pixel density value, wherein the strong anti-aliasing mechanism is performed by shifting positions of the plurality of neighboring pixels of the corresponding position in the first input image of the plurality of input images toward respective group centers and by adapting weights for the plurality of neighboring pixels correspondingly.

10. The apparatus of claim 9, wherein the at least one processor is further configured to:
upon determining that the first pixel density value is equal to or lower than a threshold, calculate the first output brightness value corresponding to the first output pixel position in the output image based on a brightness value of a pixel in the first input image of the plurality of input images corresponding to the first output pixel position in the output image.

11. The apparatus of claim 9, wherein the at least one processor configured to obtain the first pixel density value corresponding to the first output pixel position in the output image is configured to:
select a second output pixel directly to the left of the first output pixel position in the output image, and selecting a third output pixel directly to the right of the first output pixel position in the output image;
determine a second input pixel position and a third input pixel position in the first input image, corresponding to the second and third output pixel positions in the output image, respectively;
calculate a first distance value between the second input pixel position and the third input pixel position;
select a fourth output pixel directly above the first output pixel position in the output image, and selecting a fifth output pixel directly to the bottom of the first output pixel position in the output image;
determine a fourth input pixel position and a fifth input pixel position in the first input image, corresponding to the fourth and fifth output pixel positions in the output image, respectively;
calculate a second distance value between the fourth input pixel position and the fifth input pixel position; and
calculate the first pixel density value corresponding to the first output pixel position in the output image as a function of a maximum of the first distance value and the second distance value.

12. The apparatus of claim 9, wherein the processor configured to obtain the first pixel density value receives the predetermined pixel density value corresponding to the first output pixel position in the output image.

13. The apparatus of claim 9, wherein the first pixel density value represents a measure of number of pixels in an input image that are mapped between the first output pixel in the output image and a second pixel directly adjacent to the first output pixel in the output image.

14. The apparatus of claim 9, wherein the processor configured to determine the first output pixel brightness value corresponding to the first output pixel position in the output image is further configured to calculate the first output brightness value corresponding to the first output pixel position in the output image as a weighted average of the plurality of brightness values corresponding to the plurality of neighboring pixel values in the first input image.

15. The apparatus of claim 14, wherein a weight corresponding to each brightness value is calculated based on a distance between a position in the first input image corresponding to the first output pixel in the output image and each of four pixels directly adjacent to the position in the first input image.

16. The apparatus of claim 14, wherein the plurality of brightness values comprise prefiltered brightness values corresponding to each of the plurality of the neighboring pixel values in the first input image, wherein the prefiltered brightness values are calculated by a graphics processing unit (GPU) by means of bilinear interpolation.

17. A non-transitory computer-readable storage medium storing instructions that, when executed by one or more processors, cause the one or more processors to perform the following:
   obtain a plurality of input images captured by a plurality of cameras, each camera having a different field of view of an environment surrounding a vehicle, wherein the plurality of input images being mapped to an output image such that the output image represents the environment from a predefined virtual point of view; and
   for each output pixel position in the output image: obtain a first pixel density value corresponding to a first output pixel position in the output image; and
   upon determining that the first pixel density value is higher than a threshold, calculate a first output brightness value corresponding to the first output pixel position in the output image based at least on a plurality of brightness values corresponding to a plurality of neighboring pixels of a corresponding position in a first input image of the plurality of input images,
   wherein the first pixel density value determines an amount of sub-sampling or up-sampling of image content when mapping the plurality of input images to the first output pixel position in the output image through a target viewport, and
   determining that a strong anti-aliasing mechanism is needed when the first pixel density value is greater than a predetermined pixel density value, wherein the strong anti aliasing mechanism is performed by shifting positions of the plurality of neighboring pixels of the corresponding position in the first input image of the plurality of input images toward respective group centers and by adapting weights for the plurality of neighboring pixels correspondingly.

18. The computer-readable storage medium of claim 17, wherein the instructions further cause the one or more processors to:
   upon determining that the first pixel density value is equal to or lower than a threshold, calculate the first output brightness value corresponding to the first output pixel position in the output image based on a brightness value of a pixel in the first input image of the plurality of input images corresponding to the first output pixel position in the output image.

19. The computer-readable storage medium of claim 17, wherein the instructions further cause the one or more processors to:
   select a second output pixel directly to the left of the first output pixel position in the output image, and selecting a third output pixel directly to the right of the first output pixel position in the output image;
   determine a second input pixel position and a third input pixel position in the first input image, corresponding to the second and third output pixel positions in the output image, respectively;
   calculate a first distance value between the second input pixel position and the third input pixel position;
   select a fourth output pixel directly above the first output pixel position in the output image, and selecting a fifth output pixel directly to the bottom of the first output pixel position in the output image;
   determine a fourth input pixel position and a fifth input pixel position in the first input image, corresponding to the fourth and fifth output pixel positions in the output image, respectively;
   calculate a second distance value between the fourth input pixel position and the fifth input pixel position; and
   calculate the first pixel density value corresponding to the first output pixel position in the output image as a function of a maximum of the first distance value and the second distance value.

20. The computer-readable storage medium of claim 17, wherein the first pixel density value represents a measure of number of pixels in an input image that are mapped between the first output pixel in the output image and a second pixel directly adjacent to the first output pixel in the output image.

* * * * *